J. ZOLLER & R. SCHUSTER.
BRAKE.
APPLICATION FILED JUNE 4, 1914.
1,131,810.
Patented Mar. 16, 1915.
3 SHEETS—SHEET 1.
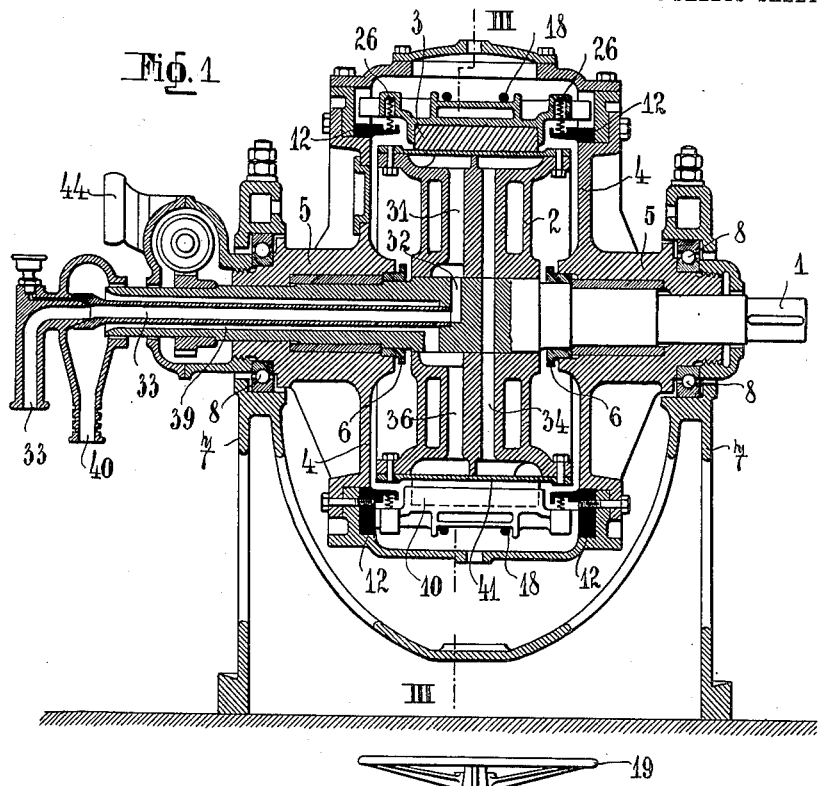
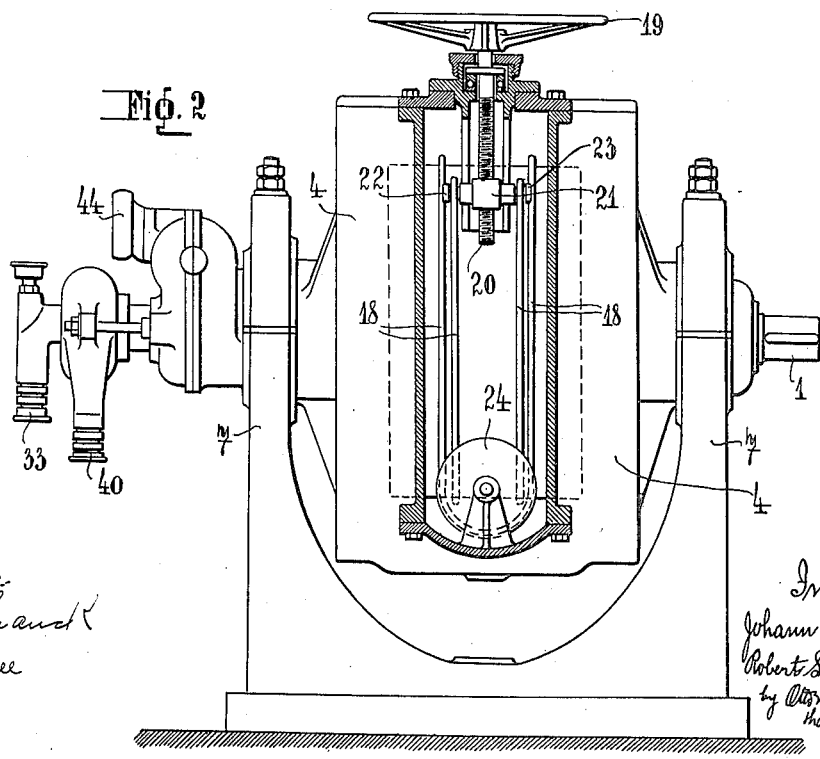

J. ZOLLER & R. SCHUSTER.
BRAKE.
APPLICATION FILED JUNE 4, 1914.

1,131,810.

Patented Mar. 16, 1915.
3 SHEETS—SHEET 2.

Witnesses:

Inventors:
Johann Zoller
Robert Schuster
by
their Attorney

J. ZOLLER & R. SCHUSTER.
BRAKE.
APPLICATION FILED JUNE 4, 1914.
1,131,810. Patented Mar. 16, 1915.
3 SHEETS—SHEET 3.
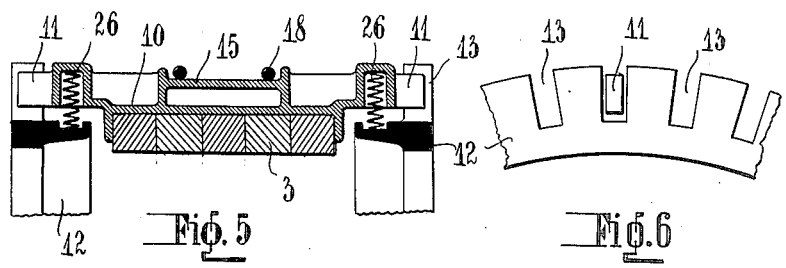
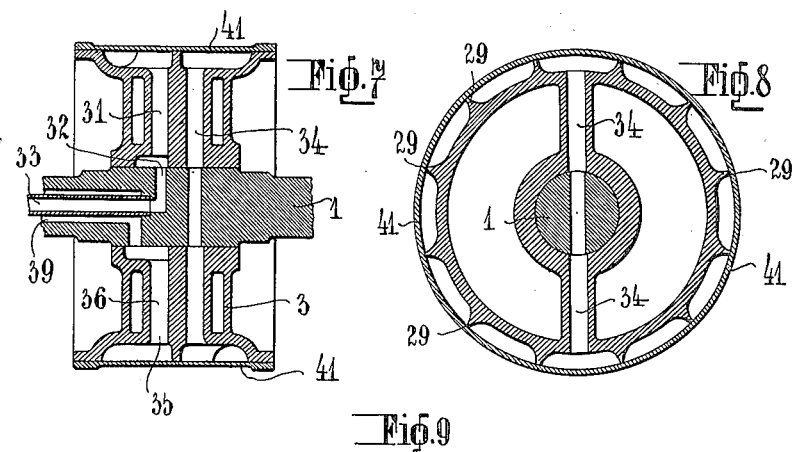
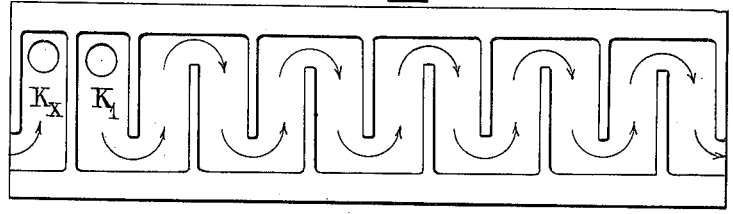
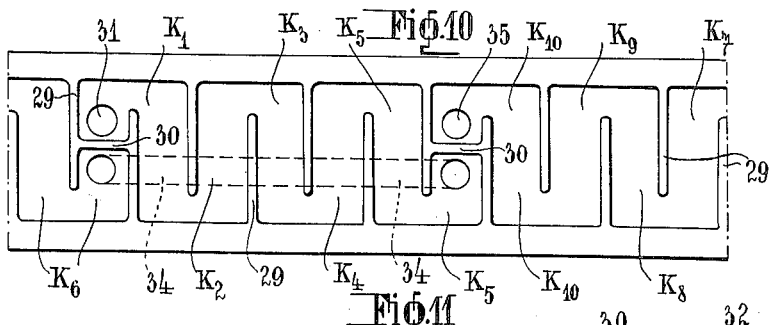
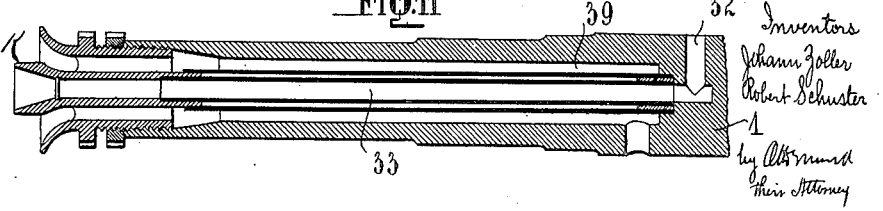
Witnesses.
Inventors
Johann Zoller
Robert Schuster

UNITED STATES PATENT OFFICE.

JOHANN ZOLLER AND ROBERT SCHUSTER, OF VIENNA, AUSTRIA-HUNGARY.

BRAKE.

1,131,810.   Specification of Letters Patent.   Patented Mar. 16, 1915.

Application filed June 4, 1914. Serial No. 842,880.

*To all whom it may concern:*

Be it known that we, JOHANN ZOLLER and ROBERT SCHUSTER, residing at Schlagergasse 10, Vienna, IX, Austria-Hungary, have invented certain new and useful Improvements in and Relating to Brakes, of which the following is a specification.

This invention relates to brakes of the type adapted to effect the required retarding effort on the crank shaft of a primary mover or on a shaft forming part of a system of transmission but more particularly to the type known as dynamometers.

Our invention consists in the improved constructions hereinafter fully described.

It is known that all brakes serving for braking mechanical work suffer from the serious defect that they do not permit of steady and smooth braking. The main reason for this is what is called the locking of the braking members with the brake drum, which, as is known, not only gives rise to shocks, but also produces highly unfavorable strains on the brake. This locking of the brake members is particularly disadvantageous in the mechanical brakes employed as dynamometers as in these brakes, by the locking of the brake members with the brake drum the resistance of the brake, which is so important for exact measuring, is lost. Now it has been found that all the said defects inherent in mechanical brakes can be eliminated by immersing the brake element through the interior of which liquid cooling agents circulate, with the braking members arranged upon it in a vessel filled with lubricants, so that the braking is effected with permanently equal external lubrication and constant uniform internal cooling.

A brake construction particularly suitable for dynamometers, is illustrated in the accompanying drawing by way of example.

Figure 3:
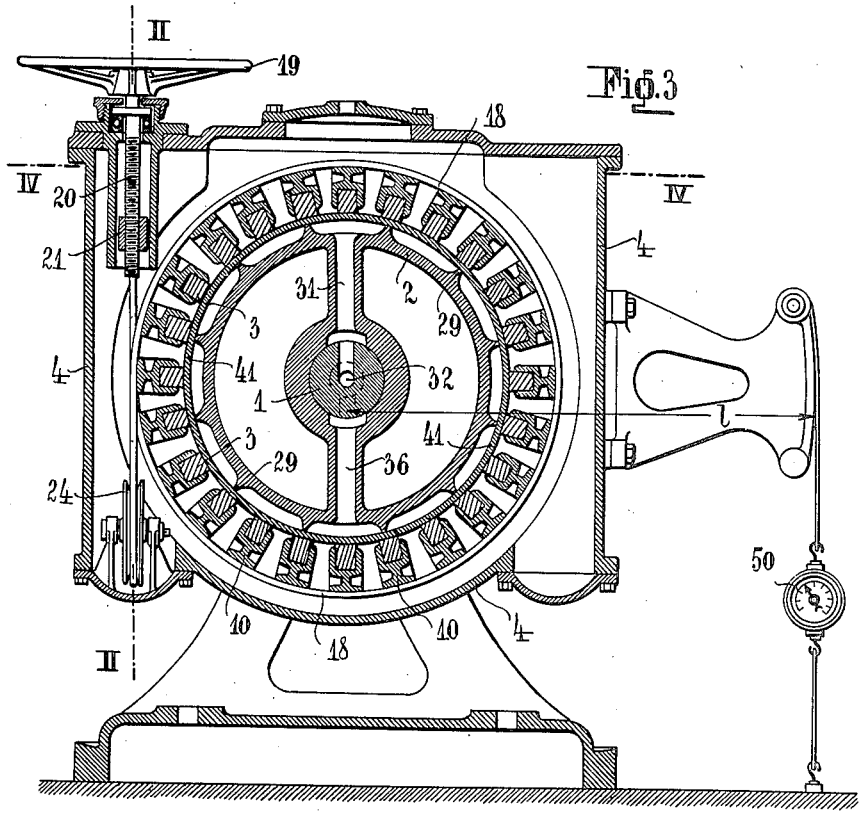
Figure 4:
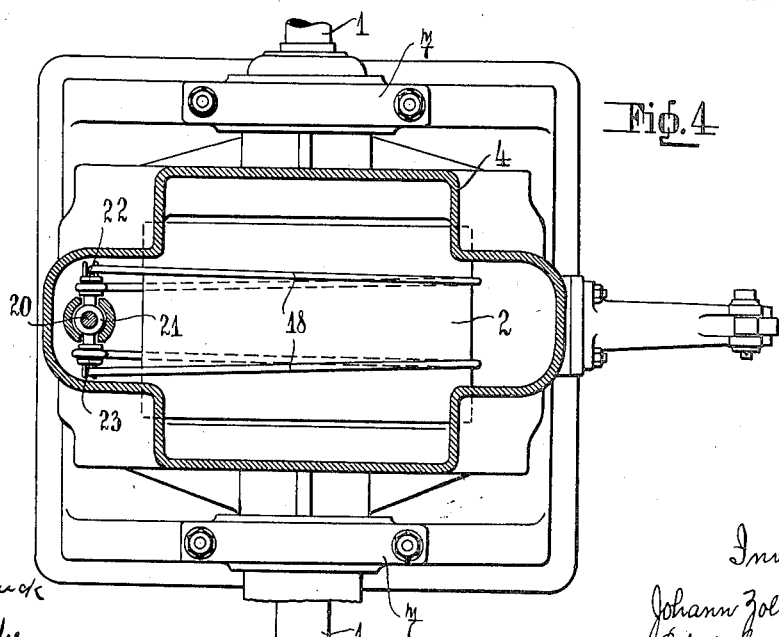

Figure 1 is a longitudinal section of the brake. Fig. 2 is a section on the line II—II in Fig. 3. Fig. 3 is a section on the line III—III in Fig. 1. Fig. 4 is a horizontal section on the line IV—IV in Fig. 3. Figs. 5 and 6 represent details of the brake in section and in elevation on an enlarged scale. Figs. 7 and 8 represent a particularly advantageous construction of the brake drum in longitudinal section and in cross-section respectively. Fig. 9 illustrates the periphery of a brake drum in development. Fig. 10 represents the developed periphery of the brake drum in accordance with Figs. 7 and 8, and Fig. 11 illustrates a constructional form of the conduits for the supply and discharge of the cooling agent.

The brake consists of a shaft 1 coupled in the known manner with the engine, the brake drum 2 being mounted on this shaft.

A series of brake blocks 3 rest on the brake drum 2 and are pressed with equal pressure radially against the brake drum by means of pressure mechanism of a construction hereinafter described.

The brake drum 2 with the brake blocks 3 arranged thereon is inclosed in a specially formed casing 4 which presents the form of a closed dish fitting as closely as possible around the body of the brake drum. This casing 4 serves for the reception of liquid lubricants such as oil or oil emulsions and the like and is of such a size that the brake drum with the blocks arranged around it can be wholly or almost wholly immersed in the lubricant. On its side walls the casing 4 presents two bearings 5, 5 comprising bores in which the brake shaft 1 is rotatably mounted. A good joint is obtained between the brake shaft and the lubricant receptacle by means of stuffing boxes 6, 6. The lubricant receptacle 4 is supported by means of its journals 5, 5 which have bearings in a block 7 provided with ball bearings 8, 8.

In the construction illustrated in the drawing, the braking members of the brake consist of simple blocks distributed over the entire periphery of the brake drum and arranged parallel with its generatrix. Lignum sanctum has proved to be a particularly suitable material for the brake blocks. In place of the wide brake blocks represented in Fig. 1, a plurality of brake blocks composed of smaller blocks can be employed as shown in Fig. 5.

Each of the braking members 3 is combined with a holder 10 comprising on each of its ends a rib 11, 11. On each side of the brake drum a guide plate 12, 12 arranged on the walls of the lubricant receptacle 4 is fixed; on its periphery this plate is provided with a series of radially directed guide slots 13 (Fig. 6); the ribs 11, 11 of the brake block holder 10 being inserted in these slots.

Each of the brake block holders 10 is provided at the middle with a web 15 on which the pressure mechanism pressing the brake block holders or the brake blocks against the brake drum acts. In the embodiment of the invention illustrated in the drawing, this pressure mechanism consists of a cable or band 18 loosely surrounding the brake block holders, so that when the band is tightened, it simultaneously and uniformly applies all the brake blocks 3 to the brake drum. With this object tensioning mechanism is provided on the lubricant receptacle 4 for tightening the ends of the band; in the embodiment of the invention here illustrated, this mechanism consists of a screw spindle 20 rotatably mounted and adapted to be operated by the hand wheel 19 and a longitudinally displaceable nut 21 secured against rotation. The nut 21 is formed as a cross head and provided with two bolts 22, 23 upon which the ends of the band 18 are fixed in the manner shown in Fig. 2. The band passes downward from the fixing bolt 22 and around the brake blocks arranged upon the brake drum; it then passes over a compensating roller 24 fixed to the bottom of the lubricant receptacle. The length of cable or band running off this roller 24 is again passed around the brake block holders upon the brake drum, its end being secured to the bolt 23 of the cross head 21. The cable is thus divided into two groups of cable turns by the roller 24 and when traction is exerted on the end secured to the cross head, these groups insure the simultaneous and uniform application of all the brake blocks resting on the brake drum. The method of guiding the cable, the construction and arrangement of the tensioning mechanism and the number and arrangement of the compensating rollers can be modified in any convenient manner without departing from the principle of the invention.

In order that when slackening the cable, that is to say releasing the brake, the brake blocks may be lifted immediately from the brake drum, the brake block holders are caused to bear by springs 26 against the annular plates 12 (see Figs. 5 and 1).

By means of the arrangements described an extremely sensitive adjustment of the application of the brake blocks is insured without impeding the access of the lubricant contained in the receptacle 4 to the places at which the brake blocks are applied.

In order to permit of combining the drum cooling, which is known *per se*, in the most effective manner with the lubricant bath for the brake drum described above, it is necessary to adopt a special method of causing the cooling agent to circulate in the system, as otherwise the favorable action of the bath lubrication would be entirely lost. With this object the arrangement is adopted that at adjacent places on the brake drum the existence of large differences of temperature in the circulating cooling agent is avoided. The most simple method of insuring this is by forming the peripheral cooling jacket and the conduits for the supply and discharge of the cooling medium in the following manner:

The brake drum 2 (Figs. 7 and 8) is provided on its periphery in a manner known *per se* with ribs 29 which as shown by the developed cooling jacket in Fig. 10 are relatively staggered in a special manner. By this means the cooling jacket of the brake drum is divided into a series of chambers $K_1$—$K_{10}$ which produce a zigzag circulation of the cooling agent in the brake drum jacket. As shown in Figs. 10 and 7 the ribs 29 built into the chambers $K_1$ and $K_5$ are connected one with the other by ribs 30 for a reason hereinafter explained, so that the chamber $K_1$ is separated from the chamber $K_6$ and the chamber $K_5$ from the chamber $K_{10}$.

The fresh cooling water is conducted into this system of cooling chambers through a port 31 (Figs. 7 and 10) which communicates through the bore 32 with the supply pipe 33 for the cooling agent which is inserted in this bore. The cooling agent circulates through the chambers $K_1$—$K_5$ of the brake drum and in accordance with the invention is re-conducted through a special circulation passage 34 into the chamber $K_6$ adjacent to the chamber $K_1$. From the chamber $K_6$ the cooling agent flows through the chambers $K_7$ to $K_9$ into the chamber $K_{10}$ and leaves the jacket of the drum through the discharge aperture 35 (Figs. 7 and 10). The discharge aperture 35 communicates with a bore 36 provided in the brake drum and this opens in the axial bore in the brake shaft 39.

A discharge socket 40 is provided at the end of the hollow brake shaft (Fig. 1) and through this the heated cooling water flows out of the brake drum. If the fresh cooling water were simply admitted through the admission aperture 31 (Fig. 9) into the cooling jacket of the brake drum and allowed to circulate in an uninterrupted cycle (see the direction indicated by the arrow in Fig. 9) through the jacket of the drum, the chamber $K_1$ would always be filled with fresh and therefore cold water and the adjacent chamber $K_x$ with the hottest cooling water. This great difference of temperature between the two adjacent chambers would not only give rise to unfavorable local modifications of the viscosity of the lubricant adhering to the periphery of the drum, but would also give rise to unfavorable tensions in the ribs dividing the chambers. This great difference of temperature between the two adjacent chambers is avoided in the form of brake drum illustrated in Fig. 10 of the drawing as owing to the provision of the circulation passage 34 cooling water of mean heating temperature is re-conducted into the chamber $K_6$ whereby the difference of temperature between the cooling agent in the chambers $K_1$ and $K_6$ is reduced. In addition to this, the arrangement described affords the further advantage that the ribs 29, 30 of the cooling jacket can be made very thin and caused to run almost to a point toward the periphery of the drum. In this construction the periphery 41 of the brake drum can be formed of very thin material such for example as sheet steel by which division of the brake drum the formation of the brake drum casting is very largely facilitated.

In order to avoid the heating of the fresh cooling water flowing through the admission pipe 33 into the brake drum by the heated cooling water re-conducted over the admission pipe 33, this pipe can be formed as a double pipe, the interval being filled with substances which are bad conductors of heat such for example as ashes or asbestos.

It will of course be understood that the arrangement described above can be adopted for all brakes usually employed for technical purposes, as owing to their construction, they can readily be fitted to any rotary brake member. The cable or strap arrangement described can either be employed for applying brake blocks or the cable can be slung directly around the brake drum, in which case the brake acts merely as a cable brake.

The brake is especially advantageous when employed as a dynamometer as owing to the combined internal cooling and external lubrication of the brake, it presents extraordinarily great resistance within very wide limits of output, so that very exact measuring is effected. When employed as a dynamometer the manipulation of the brake is as follows: In the first place the lubricant reservoir 4 is filled with oil or some other suitable liquid lubricant to such an extent that the brake mechanisms contained in the receptacle are covered entirely or almost entirely by the bath of lubricant. When this has been effected, the internal cooling of the brake drum is started and the engine to be tested is coupled in the known manner with the brake drum. Then by rotating the hand wheel 19 the ends of the cable 18 passed around the brake blocks 3 are applied until resistance arises in the system. During the entire braking operation, the lubricating liquid flows from all sides uniformly between the brake blocks and brake plate, so that a thoroughly uniform lubrication of the internally cooled brake drum is permanently insured. When fluctuations in the load of the engine to be braked occur, it is only necessary to effect very small adjustments by means of the hand wheel 19 whereby the brake is immediately re-set in its condition of resistance. On braking the turning moment of the brake plate 2 is transmitted to the rotatably mounted lubricant reservoir 4 and measured by suitable devices 50, such for example as a spring balance, weights, or gages on its lever arm I (see Fig. 3). The power of the engine can be calculated in the known manner from the turning moment and the number of revolutions read upon the revolution counter 44. In the present case the power agrees exactly with the useful work of the engine, as owing to the special formation of the brake mechanism, all errors of measurement which would otherwise exist, are allowed for and the great permanency of the brake within extraordinarily wide power limits permits of taking extremely exact readings.

Having thus described our invention and explained the mode of operation thereof, we claim and desire to secure by Letters Patent—

1. In a mechanical brake, the combination of a frictional braking member, means for applying a cooling medium interiorly thereof, and means for applying a lubricant exteriorly of said braking member.

2. In a mechanical brake, the combination of a frictional braking member, means for applying a cooling medium interiorly thereof, and a casing adapted to contain lubricant and in which said braking member is arranged.

3. In a mechanical brake, the combination of a brake drum with means for circulating a liquid cooling medium in the interior thereof, braking members adapted to co-act with said drum, and a casing adapted to contain lubricant and in which said drum and braking members are arranged.

4. In a mechanical brake, the combination of a brake drum with means for applying a cooling medium interiorly thereof, braking members adapted to co-act with said drum, guides for said braking members, and a casing adapted to contain lubricant and in which said drum and braking members are arranged.

5. In a mechanical brake, the combination of a brake drum with means for applying a cooling medium interiorly thereof, braking members adapted to co-act with said drum, a casing adapted to contain lubricant and in which said drum and braking members are arranged, and guides for the braking members carried by said casing.

6. In a mechanical brake, the combination of a brake drum with means for applying a cooling medium interiorly thereof, braking members adapted to co-act with said drum, plates provided with slots for guiding said braking members, and a casing adapted to contain lubricant and in which said drum and braking members are arranged.

7. In a mechanical brake, the combination of a brake drum with means for applying a cooling medium interiorly thereof, braking members extending about the entire periphery of said drum and adapted to co-act with the latter, holders in which said braking members are mounted, and a casing adapted to contain lubricant and in which said drum and braking members are arranged.

8. In a mechanical brake, the combination of a brake drum with means for applying a cooling medium interiorly thereof, braking members adapted to co-act with said drum, cables passing about said braking members and adapted to force the same into engagement with said drum, and a casing adapted to contain lubricant and in which said drum and braking members are arranged.

9. In a mechanical brake, the combination of a brake drum with means for applying a cooling medium interiorly thereof, braking members adapted to co-act with said drum, cables passing about said braking members and adapted to force the same into engagement with said drum, rollers over which said cables are guided, and a casing adapted to contain lubricant and in which said drum and braking members are arranged.

10. In a mechanical brake, the combination of a brake drum with means for circulating a liquid cooling medium in the interior thereof, braking members adapted to co-act with said drum, a casing adapted to contain lubricant and in which said drum and braking members are arranged, and means whereby said cooling medium is fed to and discharged from said drum through said casing.

11. In a mechanical brake, the combination of a brake drum having a plurality of peripheral cooling chambers and an inlet and outlet for the cooling medium, braking members adapted to co-act with said drum, means connecting a cooling chamber adjacent said inlet to another cooling chamber between said inlet and said outlet, and a casing adapted to contain lubricant and in which said drum and braking members are arranged.

12. In a mechanical brake, the combination of a brake drum with means for applying a cooling medium interiorly thereof, braking members adapted to co-act with said drum, a casing adapted to contain lubricant and in which said drum and braking members are arranged, and a support for said casing in which the latter may be rocked.

In testimony whereof we affix signatures in presence of two witnesses.

JOHANN ZOLLER.
ROBERT SCHUSTER.

Witnesses:
August Fugger,
Ada Maria Berger.